L. G. VOLKMAR.
Apparatus for Drying and Preserving by Cold Air.

No. 227,326.                                 Patented May 4, 1880.

Witnesses:
H. W. Duszowski M.D.
J. W. Watson.

Inventor:
Louis G. Volkmar.

UNITED STATES PATENT OFFICE.

LOUIS G. VOLKMAR, OF NEW YORK, N. Y.

APPARATUS FOR DRYING AND PRESERVING BY COLD AIR.

SPECIFICATION forming part of Letters Patent No. 227,326, dated May 4, 1880.

Application filed July 8, 1879.

*To all whom it may concern:*

Be it known that I, LOUIS G. VOLKMAR, of the city, county, and State of New York, have invented a new and useful Improvement in Fruit-Driers; and I do hereby declare that the following is a full, clear, and exact description of the same.

In preserving fruit, vegetables, and meats by what is known as the "refrigerating" process, a current of air of reduced temperature is, in many instances, forced into and through the chamber or receptacle containing the substances to be preserved. In other cases the air is drawn from a well or through a tube passing through a cellar, the current being established and maintained by the rarefaction of the air in the preserving-chamber.

My invention consists of a portable apparatus for use in drying fruit, &c., by means of a cold-air current, which is conducted through a tube that traverses an ice-box, and is so arranged therein that ice may be packed around and in contact with it, all as hereinafter described.

Figure 1:
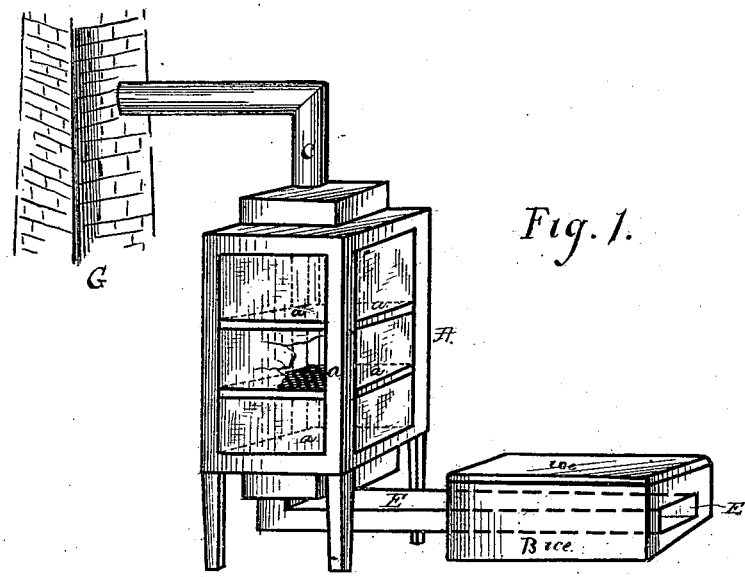
Figure 2:
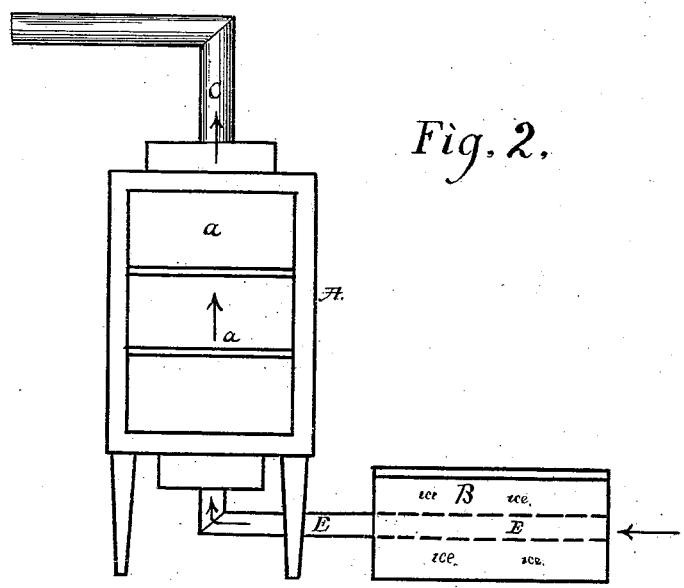

In accompanying drawings, Figure 1 is a perspective view, and Fig. 2 a side elevation, of the apparatus.

The fruit-receptacle consists of a rectangular box or casing, A, supported by legs or by other means, and having a series of horizontal trays or screens, $a$, which are formed of frames having wire-cloth or muslin attached, so that air may pass freely through them.

The walls or sides of the box A may be formed of glass plates, and a door is suitably arranged for convenience of access to the interior of the same.

The ice-box B and fruit-box A are connected by a tube, E, which extends through the lengthwise middle of the former and is open at each end.

Ice being packed in the box B around the tube D, and the fruit-box A connected, by means of a pipe, C, with a chimney, G, or a stove, as may be most convenient, a current of air will be established through the tube E, fruit-box A, and pipe C, as shown by the arrows, Fig. 2. In passing through the portion of tube E which is inclosed in box B and surrounded by ice the air is cooled, without, however, coming in actual contact with the ice, so that the moisture it holds in suspension is thereby precipitated in the form of dew on the inner surface of said tube. The air being cool and dry when it enters the box A, its temperature is slightly raised by contact with the latter and the fruit contained therein, so that the capacity of the air for absorbing moisture is further increased. It therefore rapidly takes up moisture from the fruit, so that the latter is dried at the same time that it is kept at a reduced temperature.

What I claim is—

As an improvement in means for drying fruit, &c., by a current of cold air, the portable apparatus consisting of the box A, having the reticulated trays $a$, the box B, for containing ice, and the air-tube E, which traverses the central portion of the ice-box, whereby it may be completely inclosed by the ice packed therein, all as shown and described.

LOUIS G. VOLKMAR.

Witnesses:
H. W. DUSZOWSKI, M. D.,
J. W. WATSON.